(No Model.)
G. C. JOHNSON.
WHIFFLETREE HOOK.
No. 346,590. Patented Aug. 3, 1886.
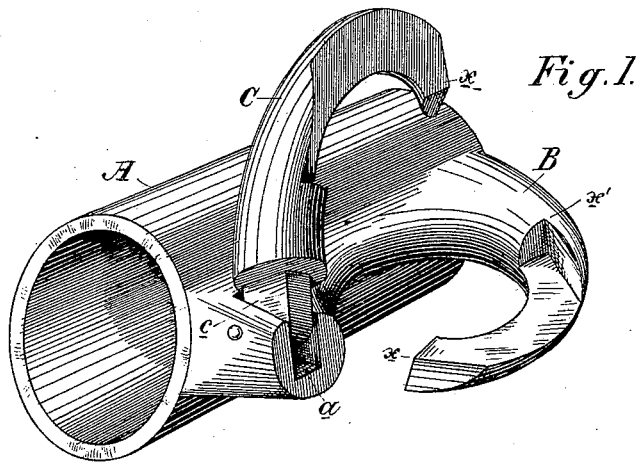
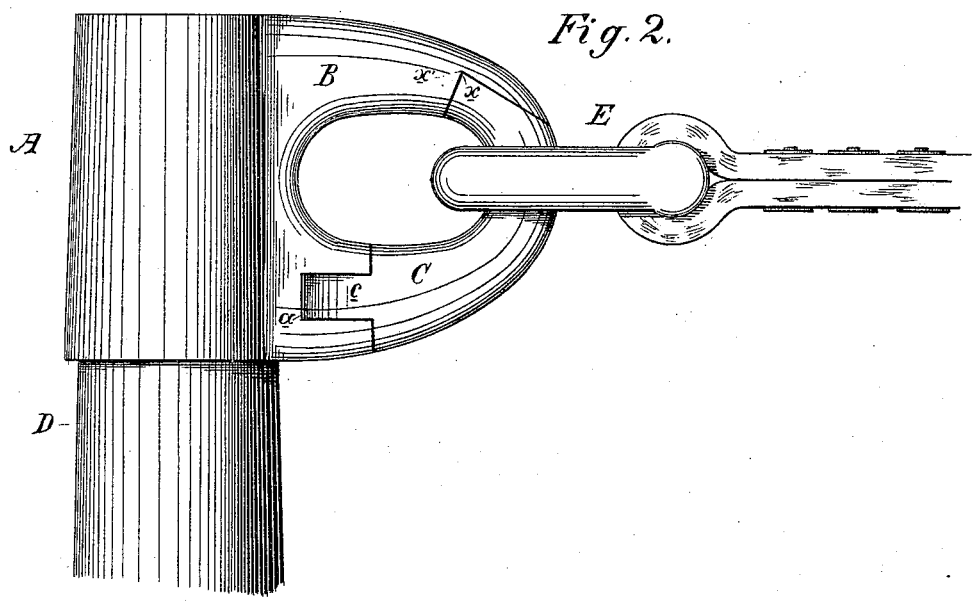

UNITED STATES PATENT OFFICE.

GEORGE C. JOHNSON, OF FORT BRAGG, CALIFORNIA.

WHIFFLETREE-HOOK.

SPECIFICATION forming part of Letters Patent No. 346,590, dated August 3, 1886.

Application filed April 9, 1886. Serial No. 198,396. (No model.)

*To all whom it may concern:*

Be it known that I, GEORGE C. JOHNSON, of Fort Bragg, Mendocino county, State of California, have invented an Improvement in Whiffletree Clips and Hooks; and I hereby declare the following to be a full, clear, and exact description of the same.

My invention relates to a new and useful clip and hook of that class in which a swinging hook overlaps and finds a seat upon a fixed hook, the two forming a ring or link in which the connecting hook, ring, or link is confined; and my invention consists in the novel joints formed between the two hooks when engaged, and in the peculiar bearing or support for the pivoted end of the swinging hook, together with the general arrangement of parts, all of which I shall hereinafter fully explain.

The object of my invention is to provide a simple, effective, and readily-applied connection between a single-tree and the tug or trace, or between a double-tree and a single-tree.

Referring to the accompanying drawings, Figure 1 is a perspective view of my whiffletree clip and hook. Fig. 2 is a view showing its application.

A is the socketed thimble or cap, having its outer end closed and its inner end open. On the forward part and at one end is formed or secured a curved hook, B. On the other end is formed a three-walled socket or chamber, $a$, in which is pivoted the shank $c$ of the curved hook C, which is adapted to swing up and down, and when at rest to find support for its pivoted end in the floor of the chamber $a$. The two hooks are so constructed as to halve into each other for a distance approximating one-half of the circumference which they inclose. Thus the swinging hook finds support for the greater part of its length, and the ends of the two hooks overlapping form together the resisting surface or portion of the device.

It will be seen that the points $x$ of the hooks are beveled on their outer surfaces on a chord of their arc, if continued, and that the adjacent surfaces of the rabbets in which they are seated are correspondingly beveled at $x'$. This construction, while permitting the swinging movement of the hook C to and from its place, provides for a much more effective resistance to to a horizontal strain.

The application of my clip and hook is seen in Fig. 2.

D is a single-tree, and E is a tug. The cap A fits over the ends of the single-tree tightly. In engaging the tug the swinging hook C is raised and the tug loop or link is slipped upon the fixed hook B. Then the hook C is dropped to its place and the connection is completed. No direct strain will effect a disengagement, but this may readily be accomplished when desired by simply raising the swinging hook C and releasing the tug from the hook B.

It is obvious that this clip and hook may be used to attach the single-tree to the double-tree by fitting it upon the ends of the double-tree and connecting it with a suitable link or hook upon the center of the single-tree.

The closed smooth end of the cap and outer surface of the hook make the device especially useful upon implements working in orchards, as the trees are not liable to be injured by the ends of the whiffletree.

Having thus described my invention, what I claim as new, and desire to secure by Letters Patent, is—

1. The socketed thimble or cap A, for fitting the end of a whiffletree, in combination with the curved hook B, fixed to the thimble or cap at one end, and the swinging curved hook C, pivoted to the thimble or cap at the other end, said hooks overlapping and halved into one another and having their ends $x$ beveled and fitting in correspondingly-beveled seats $x'$, whereby a dovetail joint is formed, substantially as described.

2. The socketed thimble or cap A, for fitting the end of a whiffletree, and the three-sided chamber or socket $a$ at one end of said thimble or cap, in combination with the fixed hook B at the other end of the thimble or cap, and the swinging hook C, pivoted and supported in the three-sided chamber $a$ and having its end halved upon the end of the hook B, substantially as described.

In witness whereof I have hereunto set my hand.

GEORGE C. JOHNSON.

Witnesses:
- JENKINS A. FITZGERALD,
- F. H. HOUSTON.